US 8,541,081 B1

(12) United States Patent
Ranganathan et al.

(10) Patent No.: US 8,541,081 B1
(45) Date of Patent: Sep. 24, 2013

(54) EASY-OPEN, RECLOSABLE PACKAGE

(71) Applicants: Sumita Sanjeevi Ranganathan, Simpsonville, SC (US); Blake L Westmoreland, Woodruff, SC (US); Andrew W Moehlenbrock, Simpsonville, SC (US); Amy Joe Frost, Moore, SC (US); Vivian Ann Shaver, Lyman, SC (US); Debra Chandler Karam, Pelzer, SC (US)

(72) Inventors: Sumita Sanjeevi Ranganathan, Simpsonville, SC (US); Blake L Westmoreland, Woodruff, SC (US); Andrew W Moehlenbrock, Simpsonville, SC (US); Amy Joe Frost, Moore, SC (US); Vivian Ann Shaver, Lyman, SC (US); Debra Chandler Karam, Pelzer, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 13/651,625

(22) Filed: Oct. 15, 2012

(51) Int. Cl.
*B29D 22/00* (2006.01)
(52) U.S. Cl.
USPC ........... 428/35.7; 428/41.7; 426/87; 426/123; 426/127; 525/201; 525/221
(58) Field of Classification Search
USPC ................. 428/35.7, 41.7; 426/123, 127, 87; 525/201, 221
See application file for complete search history.

(56) References Cited

U.S. PATENT DOCUMENTS

| 4,280,653 | A | | 7/1981 | Elias |
| 4,925,685 | A | * | 5/1990 | Sahi ............................. 426/123 |
| 5,064,664 | A | * | 11/1991 | Hustad et al. .................... 426/87 |
| 5,089,320 | A | | 2/1992 | Straus et al. |
| 5,626,929 | A | | 5/1997 | Stevenson |
| 5,882,749 | A | | 3/1999 | Jones et al. |
| 5,882,789 | A | | 3/1999 | Jones et al. |
| 6,302,321 | B1 | | 10/2001 | Reese et al. |
| 7,422,782 | B2 | | 9/2008 | Haedt et al. |
| 7,527,842 | B2 | | 5/2009 | Mathy et al. |
| 7,927,679 | B2 | | 4/2011 | Cruz et al. |
| 2006/0269707 | A1 | | 11/2006 | Berbert |
| 2009/0178945 | A1 | * | 7/2009 | Moehlenbrock et al. ..... 206/484 |
| 2009/0304874 | A1 | | 12/2009 | Stephens et al. |
| 2009/0311454 | A1 | | 12/2009 | Stephens |
| 2011/0162993 | A1 | | 7/2011 | Cruz |
| 2013/0156900 | A1 | * | 6/2013 | Ranganathan et al. ....... 426/123 |

FOREIGN PATENT DOCUMENTS

EP 1676785 7/2006
JP 48074583 * 10/1973

OTHER PUBLICATIONS

Wipak Mission Reclosable, Apr. 2006, 8 pages.

* cited by examiner

*Primary Examiner* — N. Edwards
(74) *Attorney, Agent, or Firm* — Mark B. Quatt

(57) ABSTRACT

An easy-open, reclosable package includes a tray with tray liner; a product; and a lidstock, including a substrate including a first layer of high modulus thermoplastic material, and a second layer including an oxygen barrier; and a coextruded film including a first layer including a blend of from 80% to 88% ionomer resin, and from 12% to 20% olefinic polymer, a second layer including a pressure sensitive adhesive, and optionally a third layer including a polymeric adhesive; wherein the first layer of the coextruded film is sealed to the tray liner; the coextruded film is adhered to an inner surface of the substrate film; and after the package is opened, and the pressure sensitive adhesive is exposed, the package can be reclosed by adhering the adhesive to a portion of the first layer of the coextruded film that remained sealed to the tray liner when the package was opened.

20 Claims, 6 Drawing Sheets

EASY-OPEN, RECLOSABLE PACKAGE

FIELD OF THE INVENTION

This invention relates to an easy-open and reclosable package, to a method of making the easy-open and reclosable package, and to a lidstock suitable for use in connection with an easy-open and reclosable package.

BACKGROUND OF THE INVENTION

Food products such as sliced luncheon meats, sliced cheeses and the like have long been packaged in trays having a lidstock cover. The trays can be pre-made trays made from various thermoplastic materials such as foamed polystyrene. Alternatively, trays can be formed from a web of thermoplastic material on the packaging machine at a food processing/packaging facility. The latter makes use of horizontal form/fill/seal equipment (such as thermoforming equipment) available from e.g. Multivac, for converting flat thermoplastic forming web into formed pockets to create trays for containing the food product. In either case, the food product is manually or automatically placed in the tray, a lidstock (also known as a non-forming web) is brought over the top of the filled tray, the filled tray is typically vacuumized or gas flushed, and the lidstock is hermetically sealed to the tray, e.g. by a perimeter heat seal on the tray flange, to finish the package. Opening of the finished package (i.e. opening with the use of tools such as scissors or knives) can provide access to the food product by the consumer. In some instances, a reclosable feature is included to permit the package to be easily reclosed, although typically not in a hermetic manner.

Food packagers often require that packages include an easy-open and reclose feature for the benefit and convenience of the consumer. Such a package is exemplified by U.S. Pat. No. 7,681,732 (Moehlenbrock et al.) issued on Mar. 23, 2010. This type of package is typically hermetic, and useful in packaging e.g. deli products in a way that offers a great number of easy-open/reclosable "events', i.e. the number of times that the package can be effectively opened and reclosed. Additional manufacturing costs are incurred, however, in installing die cuts in the lidstock used to make this kind of package. Also, for certain types of products, and/or for e.g. smaller packages, where (in the case of a food product) the package contents are likely to be consumed in a short period of time, the need for a package that can be reopened/reclosed a great number of times is reduced. In some cases, the capability of only perhaps ten effective reopen/reclose cycles are required. There is therefore a need in the marketplace for a package that provides both a manually (i.e. by hand, without the need for tools such as scissors or knives) openable and reclosable feature, and optional hermeticity of the package when made, without the need for die-cuts to provide easy-openability, while still offering the capability of multiple reopening and reclosures of the package after it has been initially opened and closed.

SUMMARY OF THE INVENTION

In a first aspect, an easy-open, reclosable package comprises a) a tray comprising a tray liner, tray bottom, tray sides, and a tray flange, wherein the tray bottom and tray sides define a tray cavity, and wherein the tray liner comprises a sealant layer comprising at least 80%, by weight of the sealant layer, of ionomer resin;

b) a product disposed in the tray cavity; and c) a laminated lidstock, sealed to the tray liner in a seal region, comprising i) a substrate film, having an outer surface and an inner surface, comprising (a) a first layer comprising a high modulus thermoplastic material selected from the group consisting of biaxially oriented polyethylene terephthalate, biaxially oriented polypropylene, and biaxially oriented nylon, and (b) a second layer comprising a polymeric oxygen barrier having an oxygen permeability, of the barrier material, less than 50 cm³ $O_2$/m²·day·atmosphere measured at a thickness of 1 mil (ASTM D 3985); and ii) a coextruded film, having an outer surface and an inner surface, comprising (a) a first layer comprising a blend of from 80% to 88%, by weight of the blend, of an ionomer resin, and from 12% to 20%, by weight of the blend, of an olefinic polymer, and (b) a second layer comprising a pressure sensitive adhesive;

wherein the first layer of the coextruded film is sealed to the tray liner; the coextruded film is adhered to the inner surface of the substrate film; and after the package has been opened, at least a portion of the pressure sensitive adhesive is exposed, and the package can be reclosed by readhering the pressure sensitive adhesive to a portion of the first layer of the coextruded film that remained sealed to the tray liner when the package was opened.

In a second aspect, a laminated lidstock comprises
a) a substrate film, having an outer surface and an inner surface, comprising i) a first layer comprising a high modulus thermoplastic material selected from the group consisting of biaxially oriented polyethylene terephthalate, biaxially oriented polypropylene, and biaxially oriented nylon, and ii) a second layer comprising a polymeric oxygen barrier having an oxygen permeability, of the barrier material, less than 50 cm³ $O_2$/m²·day·atmosphere measured at a thickness of 1 mil (ASTM D 3985); and b) a coextruded film, having an outer surface and an inner surface, comprising i) a first layer comprising a blend of from 80% to 88%, by weight of the blend, of an ionomer resin, and from 12% to 20%, by weight of the blend, of an olefinic polymer, and ii) a second layer comprising a pressure sensitive adhesive; wherein the coextruded film is adhered to the inner surface of the substrate film.

BRIEF DESCRIPTION OF THE DRAWINGS

The present invention is illustrated by reference to the following drawings, encompassing different views of various embodiments of the invention, wherein.

DEFINITIONS

Figure 1:
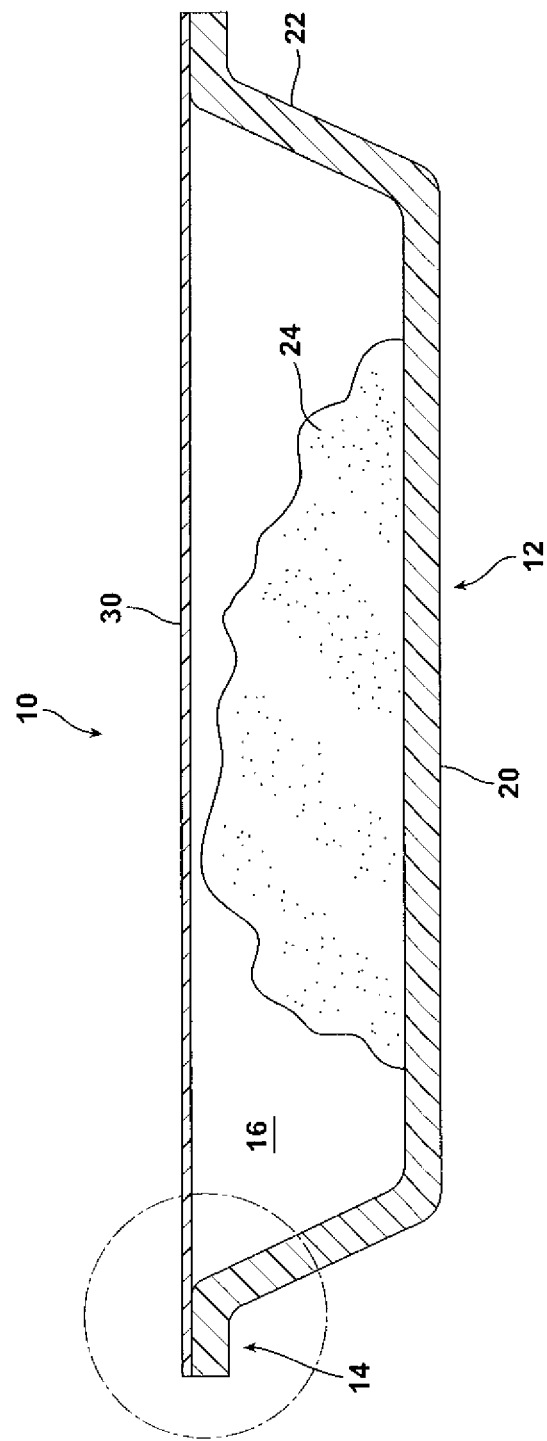
FIG. 1 is a cross sectional view of a package in accordance with an embodiment of the invention.

"Film" is used herein to mean films, laminates, and webs, either multilayer or monolayer, that may be used in connection with the present invention.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. EAO includes such heterogeneous materials as linear medium density polyethylene (LMDPE), linear low density polyethylene (LLDPE), and very low and ultra low density polyethylene (VLDPE and ULDPE), such as DOWLEX™ and ATTANE™ resins supplied by Dow, and ESCORENE™ resins supplied by Exxon; as well as linear homogeneous ethylene/alpha olefin copolymers (HEAO) such as TAFMER™ resins supplied by Mitsui Petrochemical Corporation, EXACT™ and EXCEED™ resins supplied by Exxon, long chain branched (HEAO) AFFINITY™ resins and ELITE™ resins supplied by the Dow Chemical Company, ENGAGE™ resins supplied by DuPont Dow Elastomers, and SURPASS™ resins supplied by Nova Chemicals. "EAO" also includes multicomponent ethylene/alpha-olefin interpenetrating network resin (or "IPN resin").

"Olefinic polymer" herein refers to olefinic homopolymer such as low density polyethylene (LDPE), medium density polyethylene (MDPE), high density polyethylene (HDPE); and olefinic copolymers such as ethylene/alpha olefin copolymer such as those defined herein; ethylene/vinyl acetate copolymer (EVA); ethylene/alkyl acrylate copolymer; and ethylene/(meth)acrylic acid copolymer. "Olefinic polymer" as used herein specifically excludes ionomer resin.

"Layer" herein refers to a layer, coating, web, or film.

"Lidstock" herein refers to a film, made at least in part from a thermoplastic multilayer material, that is used to cover a container or tray that carries a product, such as a food product. It can be sealed to the tray, typically as a perimeter heat seal. Lidstock typically is supplied to a food processor in a lay flat film rolled onto a roll.

"Olefinic" and the like herein refers to a polymer or copolymer derived at least in part from an olefinic monomer.

"Oxygen barrier" and the like herein refers to materials having an oxygen permeability, of the barrier material, less than 500 $cm^3$ $O_2/m^2 \cdot day \cdot atmosphere$ (tested at 1 mil thick and at 25° C., 0% RH according to ASTM D3985), such as less than 100, less than 50, less than 25, less than 10, less than 5, and less than 1 $cm^3$ $O_2/m^2 \cdot day \cdot atmosphere$. Examples of polymeric materials useful as oxygen barrier materials are ethylene/vinyl alcohol copolymer (EVOH), polyvinylidene dichloride (PVDC), vinylidene chloride/methyl acrylate copolymer, vinylidene chloride/vinyl chloride copolymer, polyamide, and polyester. Examples of polymeric materials having an oxygen permeability, of the barrier material, less than 50 $cm^3$ $O_2/m^2 \cdot day \cdot atmosphere$ are ethylene/vinyl alcohol copolymer (EVOH), polyvinylidene dichloride (PVDC), vinylidene chloride/methyl acrylate copolymer, and vinylidene chloride/vinyl chloride copolymer. The exact oxygen permeability optimally required for a given application can readily be determined through experimentation by one skilled in the art.

"Polyamide" herein refers to polymers having amide linkages along the molecular chain, and preferably to synthetic polyamides such as nylons.

"Polymer" and the like herein means a homopolymer, but also copolymers thereof, including bispolymers, terpolymers, etc.

"Pressure sensitive adhesive" (PSA) herein refers to a repositionable adhesive that bonds firmly with the application of light pressure. It adheres to most surfaces with very slight pressure; is available in solvent and latex or water based forms, and is often based on non-crosslinked rubber adhesives, acrylics, or polyurethanes. PSA forms viscoelastic bonds that are aggressively and permanently tacky; adhere without the need for more than hand pressure; and require no activation by water, solvent, or heat. Some PSA materials are cured by hot air, electron beam, UV, or chemical (peroxide) means. They are available in a wide variety of chemical compositions and systems including acrylic and methacrylate adhesives, emulsion-based acrylic adhesive; rubber-based pressure sensitive adhesive, styrene copolymers (styrene/isoprene/styrene and styrene/butadiene/styrene block copolymers), and silicones. In some embodiments, hot melt adhesives may be useful as well, are included herein for those embodiments as "PSA"; a hot melt adhesive is a thermoplastic adhesive compound, usually solid at room temperature which becomes fluid on heating for use. Suitable commercial examples of PSA include PS2000™ from Dow, and "acResin®", available from BASF, and comprising a UV curable polyacrylate that can be applied by conventional hot-melt coaters at temperatures of about 120° C. Suitable tackifiers can be added to acResin® or like compositions to control the tackiness of the adhesive; examples are FORAL® 85 synthetic resin available from Pinova. Tackifiers can be added to the discrete adhesive composition in any suitable amount, e.g. from 15% to 25% by weight of the total composition of PSA and tackifier. In some embodiments, the PSA can be blended with an olefinic additive such as polyethylene, ethylene/methyl acrylate copolymer, or ethylene/vinyl acetate copolymer. These blends can be in any suitable proportions of the PSA and olefinic additive, as long as the easy-open and reclosable functionality of the package is substantially maintained. Extrudable pressure sensitive hot melt adhesive, having an appropriate melt index and melt strength, can be extruded as an intermediate layer within a multilayer structure made by a blown or cast film process. This layer would impart the reclosable characteristics to the structure. Examples of extrudable PSA materials include but not limited to the M-series materials such as M3156T™ and M551™ available from Bostik; HL2942M™ available from H B Fuller; and VECTOR™ 4114A and 4186A available from Dexco. Alternatively, blends of these materials can be made with compatible materials that may act as processing aids, without unduly compromising the reclose characteristics of the original PSA. Extrudable adhesive chemistries include styrene-Isoprene-styrene and styrenebutadiene-styrene copolymers, including both the linear blocks (e.g. the resins from Bostik) and radial blocks (the VECTOR resins); silicones; high comonomer content EVA, EMA, EBA etc. based formulations; and INFUSE™ olefinic block copolymer based materials. Those skilled in the art will appreciate, after a review of this disclosure, that a particular PSA can be selected based at least in part on the particular process used to produce the film from which the discrete strip is made, e.g. coextrusion, extrusion coating, etc., and the appropriate rheology and process characteristics of the PSA desired for that process, while ensuring that the easy-open and reclosable features of the package made in accordance with the invention are substantially maintained.

"Seal" herein means a bond between the tray liner and the laminated lidstock, at the interface between the tray liner and the first layer of the coextruded film of the laminated lidstock, formed by any suitable means, that keeps the contained product enclosed in the package. The seal can be a perimeter seal, total seal, beaded seal, welded seal, or flat seal, and can be formed by various equipment types, including thermoforming or tray/lidding equipment. The seal can vary in width.

All compositional percentages used herein are presented on a "by weight" basis, unless designated otherwise.

DETAILED DESCRIPTION OF THE INVENTION

1. Package

Figure 2:
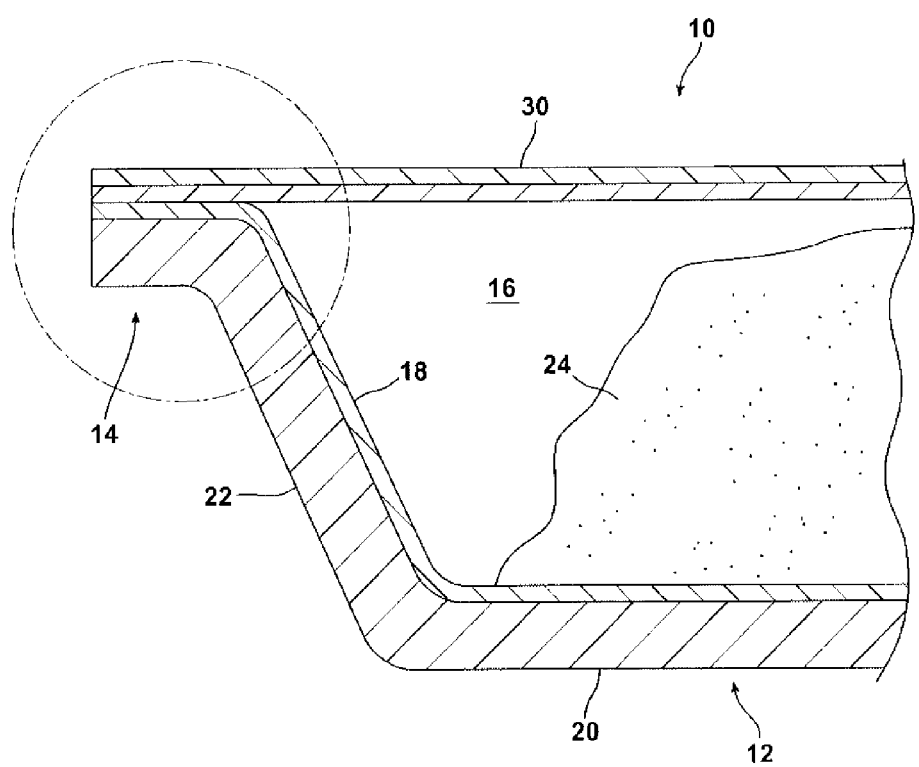
FIG. 2 is an enlarged, more detailed view of a portion of the package of FIG. 1.
Figure 3:
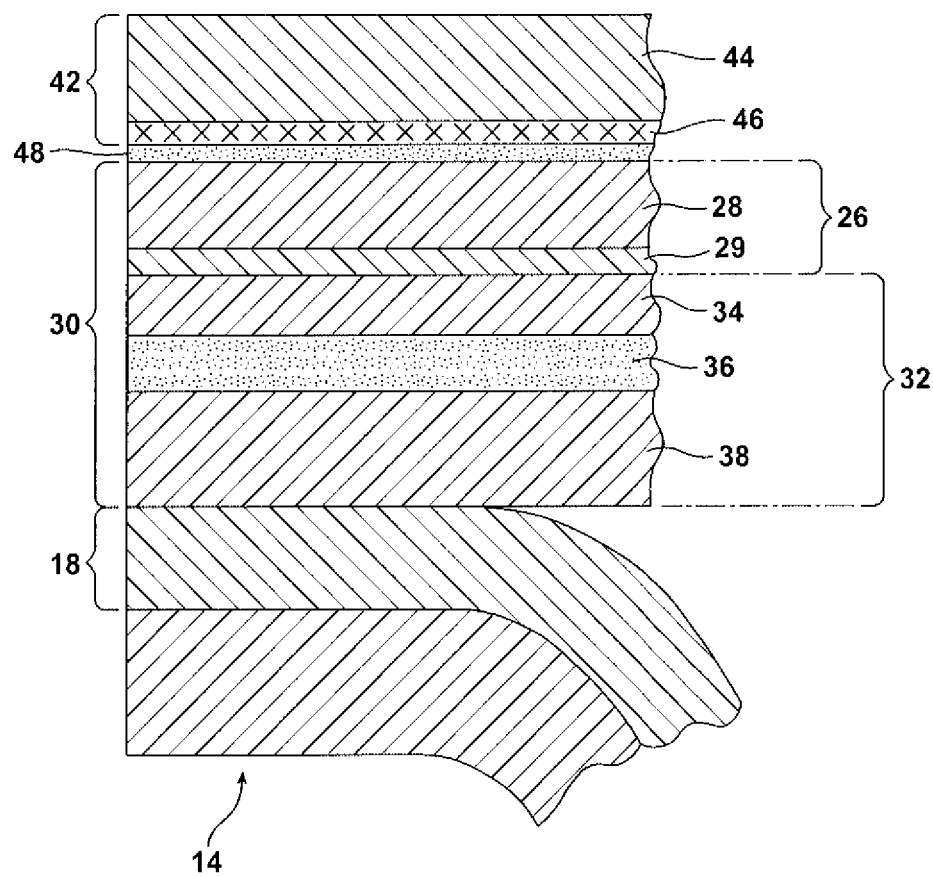
FIG. 3 is an enlarged, more detailed view of the encircled area of FIG. 2.

FIGS. 1 to 3 show an easy-open, reclosable package 10 including a tray 12, with a product 24 disposed in the cavity 16 of the tray; and a lidstock 30 sealed to the tray liner 18 in the vicinity of the tray flange 14. Tray 12 includes a tray bottom 20 and tray sides 22. Tray flange 14 is disposed along the perimeter of tray 12. The tray bottom 20 and tray sides 22 define tray cavity 16. The encircled section of FIGS. 1 and 2 is enlarged with more detail shown in FIG. 3. Products which can be stored in the cavity of the tray include e.g. red meat, processed meat, poultry, cheese, pumpable food, refrigerated prepared food, snack food, bakery product, candy or confectionery product, dried fruit, vegetable, nut, frozen food, cereal, grain, grain product, dehydrated juice mix, fresh produce, or a non-food item such as a medical or pharmaceutical, electronic, recorded programming, personal care or cosmetic, fertilizer, pesticide, herbicide, tobacco, metal, or chemical product.

In FIG. 1, the package is shown without great detail, in order to see the overall configuration of the package. Likewise, in FIG. 2, the lidstock 30 is simply shown as two layers for the sake of clarity; FIG. 3 shows more detail.

Figure 4:
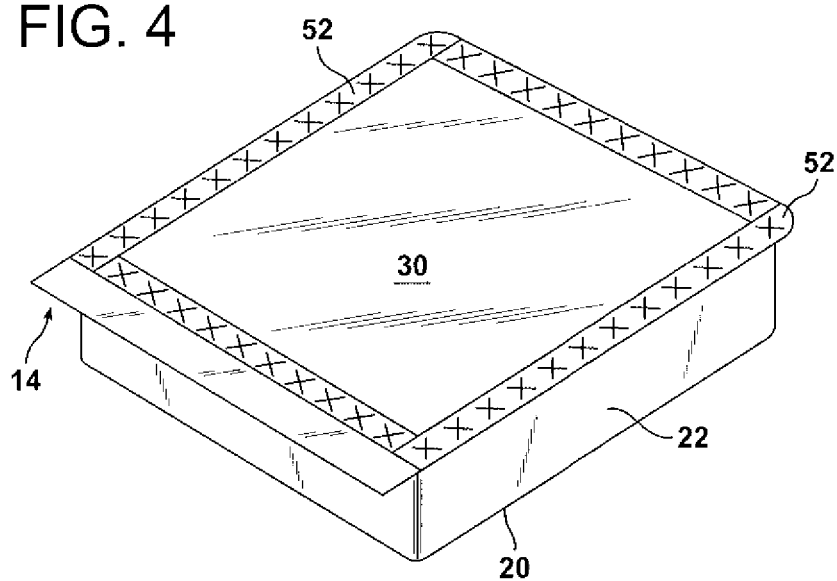
FIG. 4 is a perspective view of a package of an embodiment of the invention, in a closed condition.
Figure 5:
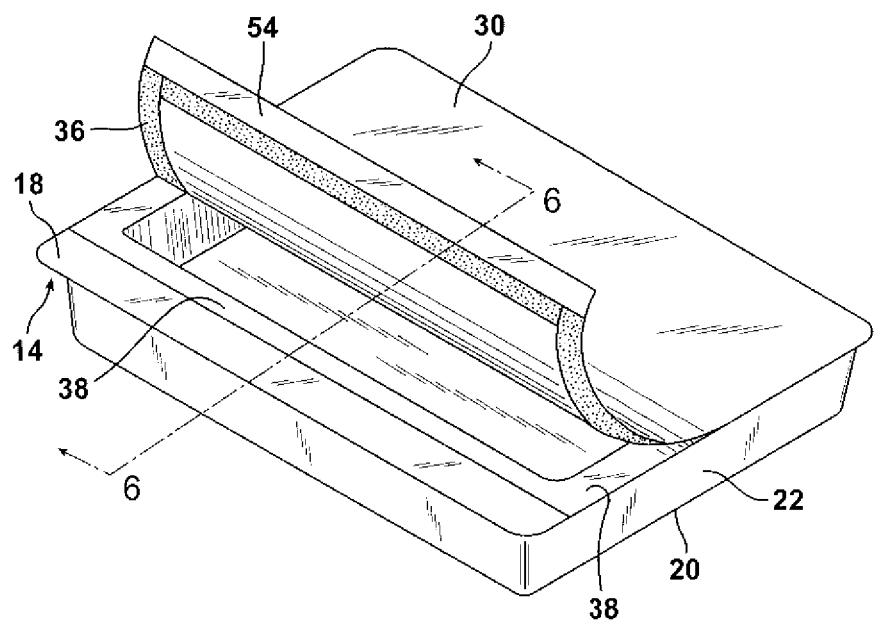
FIG. 5 is a perspective view of a package of another embodiment of the invention, in a partially opened condition.
Figure 6:
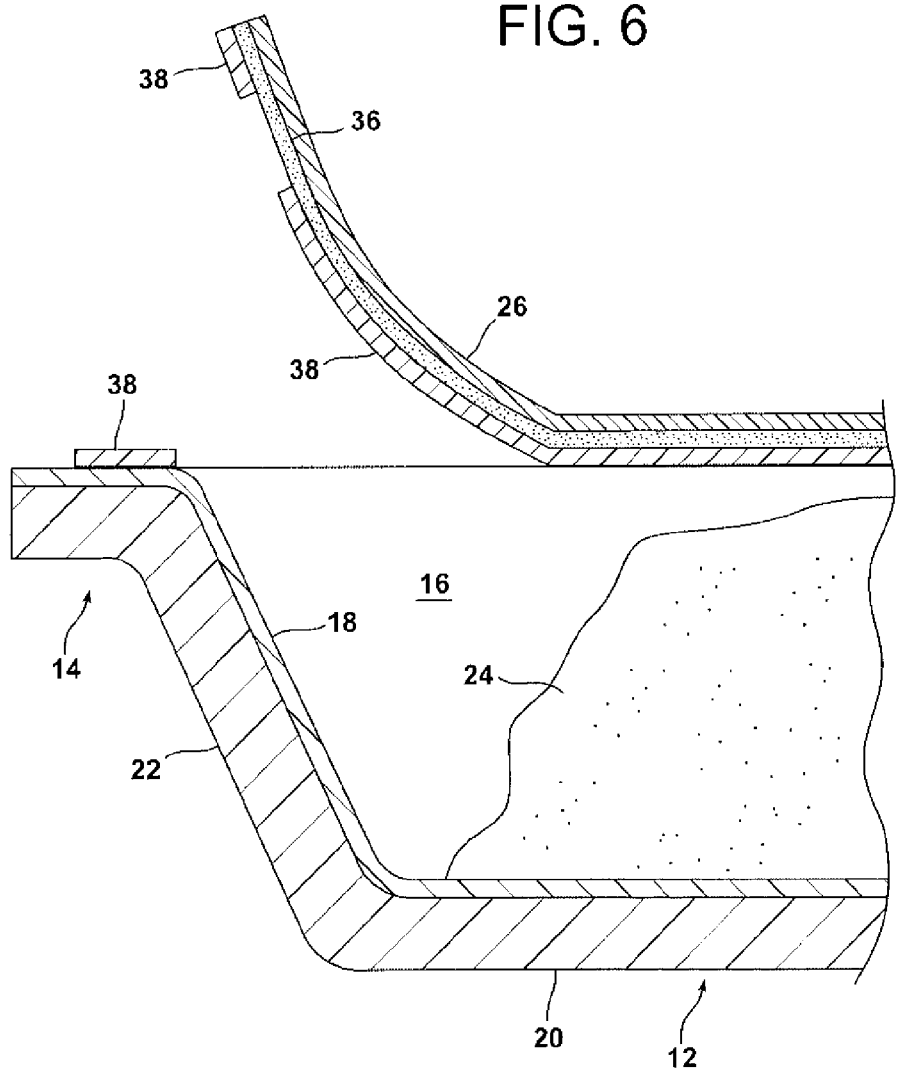
FIG. 6 is an elevational view of the package of FIG. 5, taken along lines vi-vi of FIG. 5.

FIGS. 1 to 3 show the lidstock 30 sealed to the tray liner 18 in the area of the tray flange 14 to make a seal 52 (see also FIG. 4). More specifically, third layer 38 of coextruded film 32 is sealed to the tray liner 18 of tray 12 in the tray flange 14 portion of tray 12. Sealing can be accomplished by any conventional means, e.g. by heat sealing according to methods well known in the art.

Tray 12 can be made during a packaging process. Thermoforming equipment, available from e.g. Multivac, Tiromat, or Rapid Pak, is used to convert flat thermoplastic forming web into formed pockets to create trays for containing the product. Trays are formed from a lower web by heat and pressure, and can be loaded with product manually or automatically on the machine. After that, the packages are vacuumized or backflushed with modified atmosphere (if required), sealed (optionally hermetically) to an upper web, separated, and removed for distribution or storage. Prior to any thermoforming step, tray 202 can be of any suitable thickness, e.g. from 10 and 50 mils thick, and any suitable construction.

Alternatively, a pre-made tray can be used in accordance with the invention. The tray can be rigid or semi-rigid, can be in the form of a flat or shaped tray, and can be made from any suitable material, including solid or expanded (foamed) embodiments, such as polypropylene, polystyrene, polyamide, 1,4-polymethylpentene (e.g. TPX™ available from Mitsui), polyvinyl chloride, or crystallized polyethylene terephthalate (CPET).

Tray liner 18 as used herein is typically a discrete web that is manufactured separately from the tray 12, and either fed into the packaging process (where the tray is thermoformed as discussed above) or adhered to the pre-made tray. Such a liner can be adhered to the tray by heat lamination, extrusion lamination, extrusion coating, adhesives, corona treatment, etc. Alternatively, tray liner 18 can be an integral layer or layers in a web used to make a thermoformed tray, or in a pre-made tray. Thus, "tray liner" as used herein includes either of these embodiments.

2. Laminated Lidstock

Laminated lidstock 30 comprises substrate film 26 and coextruded film 32 (see FIG. 3).

Substrate film 26 comprises a first layer 28, and a second layer 29.

First layer 28 comprises a high modulus thermoplastic material. In one embodiment, this material is characterized by a Young's modulus of between about 600,000 and 900,000 psi. Examples include polyester such as biaxially oriented polyethylene terephthalate (BOPET), polyolefin such as biaxially oriented polypropylene (BOPP), and polyamide such as biaxially oriented polyamide (BOPA).

Second layer 29 comprises a polymeric oxygen barrier having an oxygen permeability, of the barrier material, less than 50 cm$^3$ O$_2$/m$^2$·day·atmosphere measured at a thickness of 1 mil (ASTM D 3985). Examples include saran (polyvinylidene chloride (PVDC), vinylidene chloride/methyl acrylate copolymer, or vinylidene chloride/vinyl chloride copolymer) or ethylene/vinyl alcohol copolymer (EVOH). The second layer can be applied to either the outer surface of the substrate film 26, i.e. the surface facing the exterior of the package; or alternatively can be applied to the inner surface of the substrate film 26, i.e. the surface facing the interior of the package, and in contact with second layer 36 or (if present) third layer 34 of the coextruded film.

Materials useful as substrate film 26 are typically prepared by vendors and supplied to film converters. A commercial example of such film is MYLAR™ 34 from DuPont. This film is a monolayer PET film coated on at least one surface with saran.

Coextruded film 32 comprises a first layer 38, second layer 36, and optionally third layer 34.

First layer 38 comprises a blend of from 80% to 88%, by weight of the blend, of an ionomer resin, and from 12% to 20%, by weight of the blend, of an olefinic polymer. The olefinic polymer can comprise e.g. low density polyethylene, ethylene/vinyl acetate copolymer, ethylene/butyl acrylate copolymer, ethylene/acrylic acid copolymer, ethylene/methacrylic acid copolymer, ethylene/acrylate copolymer, or ethylene/methacrylate copolymer. Alternative blend ratios are 82% to 86%, 83% to 85%, and 84% to by weight of the blend, of an ionomer resin, and from 14% to 18%, 15% to 17%, and 16% by weight of the blend, of an olefinic polymer.

Second layer 36 comprises a pressure sensitive adhesive.

Optional third layer 34 comprises a polymeric adhesive. This layer functions as a tie layer to bond the coextruded film to the substrate film, and can comprise any suitable polymeric adhesive that functions to bond two layers together. Examples include ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer.

In embodiments where third layer 34 is not present, second layer 36 functions to bond the coextruded film to the substrate film.

Substrate film 26 can have any total thickness desired, and each layer can have any thickness desired, so long as the film provides the desired properties for the particular packaging application in which the film is used. Typical total film thicknesses are from 0.5 mils to 15 mils, such as 1 mil to 12 mils, such as 2 mils to 10 mils, 3 mils to 8 mils, and 4 mils to 6 mils. Substrate film 26 can be made by any suitable process; e.g. the second layer 29 can be coated onto either major surface of first layer 28.

Coextruded film 32 can have any total thickness desired, and each layer can have any thickness desired, so long as the film provides the desired properties for the particular packaging application in which the film is used. Typical total film thicknesses are from 0.5 mils to 15 mils, such as 1 mil to 12 mils, such as 2 mils to 10 mils, 3 mils to 8 mils, and 4 mils to 6 mils.

The laminated lidstock 30 can be made by any suitable process; e.g. by providing substrate film 26, and coating coextruded film 32 onto layer 29 of substrate film 26, as coextruded film 32 is being extruded, such that the laminated lidstock takes the configuration shown in FIG. 3.

The lidstock of the package is optionally printed with decorative or informational print. In one embodiment, printing indicia is disposed on at least one of a) the inner surface of second layer 29 of substrate film 26, b) the inner surface of first layer 28 of substrate film 26, or c) the outer surface of first layer 28 of substrate film 26.

In the first two of these embodiments, the printed indicia are ultimately disposed between the substrate film and the coextruded film in a trapped fashion, so that the printed indicia is not exposed to an exterior surface of the package. Nevertheless, additional printed indicia or labels could be added to the exterior of the finished package.

The printed indicia can be decorative or informational in nature, and can be in the form of registration marks or a message.

Alternatively, or additionally, an optional printed film 42 can be added to the lidstock, comprising a support layer 44 comprising e.g. any of the materials of layer 28 of the substrate film 26, and a print layer 46. The print layer 46 can be coated onto the inner surface of support layer 44 by any suitable printing process. Printed film 42 can be adhered to the outer surface of substrate film 26 (i.e. the outer surface of first layer 28) by an adhesive layer 48.

For any of the print indicia disclosed herein, the printed indicia can be of any suitable type or pattern, or ink composition; and any suitable printing technique can be used, such as rotary screen, gravure, or flexographic techniques.

3. Method of Opening and Reclosing the Package

Referring to FIGS. 4 to 7, the easy-open, reclosable package 10 in its initially closed condition appears in one embodiment as shown in FIG. 4. The package 10 can have any suitable dimensions, e.g. with respect to its length, width, depth, radii of corners of the package, etc. As pictured in the embodiment of FIG. 4, the package has been sealed (optionally hermetically) with a seal 52. The seal is made in the area of the tray flange, around the perimeter of the package, such that the first layer 38 of coextruded film 32 is sealed to the tray liner 18.

In one embodiment (FIG. 5), the seal 52 is disposed such that an end portion of laminated lidstock 30 is unsealed to the tray liner 18 or tray flange 14. This unsealed end portion defines a pull tab 54. To initially open the package, pull tab 54 is manually grasped and pulled up and away from the tray flange 14 and tray liner 18. As this action progresses, stress is put on the seal 52. As force continues to be exerted, the first layer 38 of coextruded film 32, acting as a sealant layer, ruptures up to the layer 36 comprising PSA, as a cohesive failure mechanism, and continued pulling on the laminated lidstock 30 causes delamination at the sealant layer 38/layer 36 (PSA) interface, thereby at least partially exposing the PSA of layer 36 in the area where the seal 52 was initially present (see FIG. 6). In some embodiments, depending at least in part on the choice of materials, cohesive failure within layer 36 may occur. This can result, upon opening of the package, in a portion of the PSA of layer 36 remaining adhered to the third layer 34 (if present) of coextruded film 32, and a portion of the PSA of layer 36 remaining on the sealant layer 38 in the area of seal 52. Pulling back the laminated lidstock also opens the package, allowing access to the contents 24 of the tray cavity 16. After accessing the contents, the laminated lidstock 30 can be pressed closed around the perimeter of the lidstock and tray flange to reclose the package by adhering the PSA to the portion of the first layer of the coextruded film that remained sealed to the tray liner when the package was opened. As desired, the laminated lidstock 30 can be again peeled back to reopen the package. The package can be reopened and reclosed several times.

The pull tab 54 of an individual package is defined when the laminated lidstock is sealed to a tray in a packaging process, and cut, on packaging equipment, to make individual packages, each with its own laminated lidstock 30.

Figure 7:
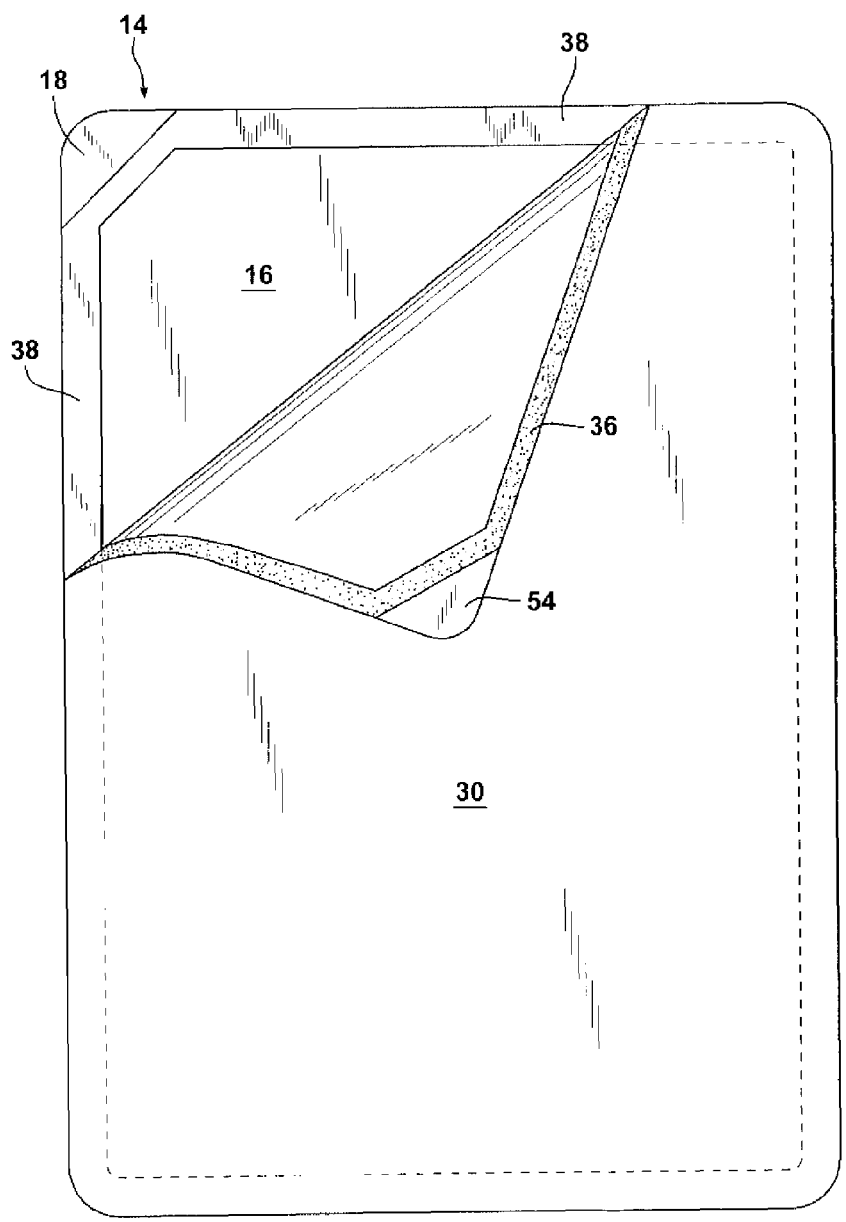
FIG. 7 is a perspective view of a package of another embodiment of the invention, in a partially opened condition.

FIG. 7 shows another embodiment in which a pull tab 54 is disposed at a corner of the package. The mechanism of opening, closing, and reopening and reclosing the package in this configuration is substantially the same as for the embodiment of FIGS. 5 and 6. The seal 52 that initially holds the laminated lidstock 30 securely to the tray liner 18 in a final package made in accordance with the invention, is disposed around the perimeter of the package, as in FIG. 5, except that near one corner of the package, as can be derived from the pattern of exposed PSA, the seal is initially disposed diagonally across and spaced apart from a corner of the package. The pull tab 54 is thus commensurate with the portion of the laminated lidstock 30 that is not sealed to the tray liner 18 in the corner of the tray flange 14 of tray 12.

1. Material

The laminated lidstock for use in accordance with the invention includes (a) a substrate film, and (b) a coextruded film. Resins for these films are identified in Table 1.

TABLE 1

| Material Code | Tradename Or Designation | Source(s) |
| --- | --- | --- |
| AD1 | BYNEL ™ E418 ™ | DuPont |
| AD2 | — | — |
| IO1 | SURLYN ™ 1702 ™ | DuPont |
| IO2 | SURLYN ™ 2601B ™ | DuPont |
| PE1 | NOVA ™ LF0718 ™ | Nova |
| PE2 | DOWLEX ™ 2070G | Dow |
| PE3 | DOW ™ 611A | Dow |
| PET1 | MYLAR ™ 822 ™ | DuPont Teijin |
| PET2 | TERPHANE ™ 22.0 ™ | Terphane |
| PET3 | MYLAR ™ XM34P ™ | DuPont Teijin |
| PSA1 | M3156 ™ | Bostik |
| PSA2 | M551 ™ | Bostik |

AD1 is a maleic anhydride grafted EVA that acts as a polymeric aanesive (tie iayer material).

AD2 is a polyurethane adhesive having about 47% aromatic isocyanate (ADCOTE™ 532A from Rohm & Haas), 44% ethyl acetate (Eastman Chemical), and 9% polyol (ADCOTE™ 532B from Rohm & Haas).

IO1 is a partially metal (zinc) salt neutralized ethylene/methacrylic acid copolymer.

IO2 is a partially metal (sodium) salt neutralized ethylene/methacrylic acid copolymer.

PE1 is LDPE.

PE2 is ethylene/1-octene copolymer (linear low density polyethylene) having a density of 0.922 gram/cubic centimeter.

PE3 is LDPE.

PET1 is a chemically primed biaxially oriented polyester (polyethylene terephthalate).

PET2 is a biaxially oriented polyester (polyethylene terephthalate) with a saran coat on one side thereof.

PET3 is a biaxially oriented polyester (polyethylene terephthalate) with a saran coat on one side thereof, and chemically primed on the other side thereof.

PSA1 is a styrene/isoprene block copolymer.

PSA2 is a styrene/isoprene block copolymer

All compositional percentages herein are by weight, unless indicated otherwise.

2. Examples

A representative film structure suitable for use as laminated lidstock 30 has the composition shown in Table 2, with reference to FIG. 3.

TABLE 2

Example 1

| | Layer | Composition | Gauge (mils) |
|---|---|---|---|
| 42 | 44 | PET1 | 0.48 |
| | 46 | printed layer | |
| | 48 | AD2 | 0.10 |
| 26 | 28 | PET2* | 0.51 |
| | 29 | | |
| 32 | 34 | AD1 | 0.68 |
| | 36 | PSA1 | 0.80 |
| | 38 | 85% IO1 + 15% PE1 | 0.31 |

Example 1 as shown has a total thickness of about 3 mils.
*In each of the examples and comparative examples herein, the substrate film 26 includes a layer (coating) of PVDC, designated as layer 29.

In each of the examples and comparative examples herein, the substrate film 26 includes a layer (coating) of PVDC, designated as layer 29.

Additional Comparative Examples and Examples of the invention are the following:

TABLE 3

(Comparative Example 2)

| | Layer | Composition | Gauge (mils) |
|---|---|---|---|
| 26 | 28 | PET3 | 1.5 |
| | 29 | | |
| 32 | 34 | AD1 | 1.0 |
| | 36 | PSA2 | 0.6 |
| | 38 | 100% PE1 | 0.4 |

Comparative Example 2 had a total thickness of about 3.5 mils.

TABLE 4

(Comparative Example 3)

| | Layer | Composition | Gauge (mils) |
|---|---|---|---|
| 26 | 28 | PET3 | 1.5 |
| | 29 | | |
| 32 | 34 | AD1 | 0.9 |
| | 36 | PSA2 | 0.7 |
| | 38 | 100% IO1 | 0.4 |

Comparative Example 3 had a total thickness of about 3.5 mils.

TABLE 5

(Example 4)

| | Layer | Composition | Gauge (mils) |
|---|---|---|---|
| 26 | 28 | PET3 | 1.5 |
| | 29 | | |
| 32 | 34 | AD1 | 0.9 |
| | 36 | PSA2 | 0.7 |
| | 38 | 85% IO1 + 15% PE1 | 0.4 |

Example 4 had a total thickness of about 3.5 mils.

TABLE 6

(Comparative Example 5)
(LDPE tray sealant)

| | Layer | Composition | Gauge (mils) |
|---|---|---|---|
| 26 | 28 | PET3 | 1.5 |
| | 29 | | |
| 32 | 34 | AD1 | 0.6 |
| | 36 | PSA1 | 1.0 |
| | 38 | 70% IO1 + 30% PE1 | 0.4 |

Comparative Example 5 as shown had a total thickness of about 3.5 mils.

TABLE 7

(Comparative Example 6)
(Ionomer tray sealant)

| | Layer | Composition | Gauge (mils) |
|---|---|---|---|
| 26 | 28 | PET3 | 1.5 |
| | 29 | | |
| 32 | 34 | AD1 | 0.6 |
| | 36 | PSA1 | 1.0 |
| | 38 | 70% IO1 + 30% PE1 | 0.4 |

Comparative_Example 6 as shown has a total thickness of about 3.5 mils.

Test Protocol

Seal strength tests were performed for the examples and comparative examples substantially in accordance with ASTM F88/F88M-09. For each example and comparative example, ten package samples were made. Each sample included a PVC tray with a tray liner, covered with a lidstock having the formulation of the relevant example. No products were included in the tray/lidstock package of each sample. The lidstock was for each sample sealed to the perimeter of the tray liner using a Multivac R530™ thermoforming machine.

For the samples of Comparative Examples 2 and 5, the tray liner of the tray to which each of the lidstocks was sealed comprised a seven layer barrier film having a sealant layer (facing the layer 38 of the lidstock) comprising 80%, by weight of the sealant layer, of PE2, and 20% PE3.

For the samples of Comparative Examples 3 and 6, and Example 4, the tray liner of the tray to which each of the lidstocks was sealed comprised a seven layer barrier film having a sealant layer (facing the layer 38 of the lidstock) comprising 98% IO2, by weight of the sealant layer, and 2% silica in an ethylene/methacrylic acid copolymer masterbatch.

Once seals were made, a one inch wide strip incorporating the seal was cut from each of the ten samples of each example and comparative example. Each of the ten samples for each of the formulations was initially opened, by use of an Instron tester, and the opening force (the maximum force of the break of the seal) was measured using the Instron. The peel force was measured in pounds-force (lbf). After initial opening, each of the ten, one-inch strips for each formulation was then reclosed by pressing the non-forming web (the lidstock) against the forming web (the tray). Each strip was then again reopened and reclosed nine additional times, with the same mode of opening, the same procedure for assessing the peel force, and the same mode of reclosing as with the initial opening, measuring, and reclosing cycle.

The results of the tests are shown in Tables 8 and 9. Table 8 shows the average initial peel force for each formulation; Table 9 shows the average peel force for each formulation when the lidstock has been reclosed and then reopened for the second, third, and subsequent times, for a total (including initial open and reclose) of ten iterations.

TABLE 8

Initial Peel Force***

| Examples | Sealant | Gauge | Initial peel force (lbf)*** (average of 10 samples) |
|---|---|---|---|
| Comp. Ex. 2 | 100% PE1 | 0.4 | 2.40 |
|  |  |  | 0.65 |
|  |  |  | 2.10 |
| Comp. Ex. 3 | 100% IO1 | 0.4 | 4.00 |
|  |  |  | 0.79 |
|  |  |  | 2.38 |
| Ex. 4 | 85% IO1 + 15% PE1 | 0.4 | 3.2 |
|  |  |  | 0.59 |
|  |  |  | 1.99 |
| Comp. Ex. 5 | 70% IO1 + 30% PE1 | 0.4 | 2.9 |
|  |  |  | 0.52 |
|  |  |  | 1.38 |
| Comp. Ex. 6 | 70% IO1 + 30% PE1 | 0.4 | 4.04 |
|  |  |  | 0.93 |
|  |  |  | 2.50 |

***In each cell, the top number represents the peel force in lbf; the middle number, standard deviation; and the bottom number, the range between the maximum and minimum peel force.

TABLE 9

Reopening Peel Force***

| reopen # | Comp. Ex. 2 | Comp. Ex. 3 | Ex. 4 | Comp. Ex. 5 | Comp. Ex. 6 |
|---|---|---|---|---|---|
| 2 | 0.60 | 1.28 | 1.18 | 1.01 | 0.37 |
|  | 0.09 | 0.21 | 0.14 | 0.43 | 0.48 |
|  | 0.26 | 0.63 | 0.47 | 1.34 | 1.00 |
| 3 | 0.49 | 1.07 | 0.90 | 0.52 | 0.31 |
|  | 0.09 | 0.28 | 0.11 | 0.29 | 0.39 |
|  | 0.28 | 1.02 | 0.37 | 0.69 | 0.79 |
| 4 | 0.42 | 0.87 | 0.83 | 0.44 | 0.28 |
|  | 0.06 | 0.11 | 0.11 | 0.30 | 0.36 |
|  | 0.20 | 0.35 | 0.36 | 0.86 | 0.75 |
| 5 | 0.38 | 0.84 | 0.73 | 0.41 | 0.25 |
|  | 0.05 | 0.12 | 0.12 | 0.23 | 0.33 |
|  | 0.15 | 0.37 | 0.35 | 0.56 | 0.67 |
| 6 | 0.37 | 0.81 | 0.69 | 0.36 | 0.00 |
|  | 0.06 | 0.13 | 0.08 | 0.23 | 0.00 |
|  | 0.20 | 0.42 | 0.26 | 0.50 | 0.00 |
| 7 | 0.37 | 0.64 | 0.66 | 0.34 | 0.22 |
|  | 0.04 | 0.10 | 0.10 | 0.23 | 0.29 |
|  | 0.12 | 0.32 | 0.26 | 0.58 | 0.66 |
| 8 | 0.36 | 0.60 | 0.60 | 0.34 | 0.24 |
|  | 0.06 | 0.11 | 0.11 | 0.26 | 0.29 |
|  | 0.20 | 0.37 | 0.33 | 0.61 | 0.67 |
| 9 | 0.34 | 0.53 | 0.61 | 0.30 | 0.22 |
|  | 0.05 | 0.08 | 0.12 | 0.22 | 0.29 |
|  | 0.14 | 0.28 | 0.40 | 0.52 | 0.68 |
| 10 | 0.33 | 0.60 | 0.56 | 0.30 | 0.21 |
|  | 0.05 | 0.25 | 0.08 | 0.22 | 0.27 |
|  | 0.13 | 0.84 | 0.23 | 0.52 | 0.66 |

The samples of Comparative Example 2 demonstrated a desirable low initial peel, but after the second reclosure, the subsequent reopens were measured at less than 0.5 lbf of peel force. This is considered unacceptable in the marketplace.

The samples of Comparative Example 3 demonstrated acceptable reopen/reclosure performance, i.e. 9 reopens at greater than 0.5 lbf of peel force. However, the peel force of 4 lbf required to Initially open the package was too high; a package made with the formulation of Comparative Example 3 would be difficult to Initially open, and the force to open could cause tearing of the forming web (tray) and/or tray liner. This package is therefore also considered unacceptable in the marketplace.

The samples of Example 4 demonstrated a desirable low initial peel, and additionally demonstrated acceptable reopen/reclosure performance, i.e. 9 reopens at greater than 0.5 lbf of peel force. This is considered acceptable in the marketplace.

The samples of Comparative Example 5 also demonstrated a desirable relatively low (compared to Comparative Example 3) initial peel, but with significant scatter in the data with respect to reopening force; with very inconsistent reopening performance characterized by a wide range of reopening force values. This is considered unacceptable in the marketplace.

The samples of Comparative Example 6 demonstrated an unacceptably high peel force of 4 lbf to Initially open the package; a package made with the formulation of Comparative example 6 and the choice of tray liner sealant would be difficult to Initially open, and the force to open could cause tearing of the forming web (tray) and/or tray liner. The package also demonstrated significant scatter in the data with respect to reopening force, with very inconsistent reopening performance characterized by a wide range of reopening force values. This is considered unacceptable in the marketplace.

Two-Layer Coextruded Film

A prophetic laminated lidstock having a two-layer coextruded film, in accordance with the invention, is described in Table 10.

TABLE 10

(Example 7) Prophetic

|  | Layer | Composition | Gauge (mils) |
|---|---|---|---|
| 26 | 28 | PET3 | 1.5 |
|  | 29 |  |  |
| 32 | 36 | PSA2 | 1.2 |
|  | 38 | 85% IO1 + 15% PE1 | 0.3 |

Example 7 has a total thickness of about 3.0 mils.

Additional Comparative Examples are the following:

TABLE 11

(Comparative Example 8)

|  | Layer | Composition | Gauge (mils) |
|---|---|---|---|
| 26 | 28 | PET3 | 1.5 |
|  | 29 |  |  |
| 32 | 36 | PSA2 | 1.2 |
|  | 38 | 100% PE1 | 0.3 |

Comparative Example 8 had a total thickness of about 3.0 mils.

TABLE 12

(Comparative Example 9)

| Layer | | Composition | Gauge (mils) |
|---|---|---|---|
| 26 | 28 | PET3 | 1.5 |
| | 29 | | |
| 32 | 36 | PSA2 | 1.2 |
| | 38 | 100% IO1 | 0.3 |

Comparative Example 9 had a total thickness of about 3.0 mils.

TABLE 13

(Comparative Example 10)

| Layer | | Composition | Gauge (mils) |
|---|---|---|---|
| 26 | 28 | PET3 | 1.5 |
| | 29 | | |
| 32 | 36 | PSA2 | 1.2 |
| | 38 | 90% IO1 + 10% PE1 | 0.3 |

Comparative Example 10 had a total thickness of about 3.0 mils.

TABLE 14

(Comparative Example 11)
(LDPE tray sealant)

| Layer | | Composition | Gauge (mils) |
|---|---|---|---|
| 26 | 28 | PET3 | 1.5 |
| | 29 | | |
| 32 | 36 | PSA1 | 1.2 |
| | 38 | 70% IO1 + 30% PE1 | 0.3 |

Comparative Example 11 as shown had a total thickness of about 3.0 mils.

TABLE 15

(Comparative Example 12)
(Ionomer tray sealant)

| Layer | | Composition | Gauge (mils) |
|---|---|---|---|
| 26 | 28 | PET3 | 1.5 |
| | 29 | | |
| 32 | 36 | PSA1 | 1.2 |
| | 38 | 70% IO1 + 30% PE1 | 0.3 |

Comparative_Example 12 as shown has a total thickness of about 3.0 mils.

Test Protocol

For each comparative example, the same test protocol was followed as with the earlier Examples and Comparative examples discussed hereinabove.

For the samples of Comparative Examples 8 and 11, the tray liner of the tray to which each of the lidstocks was sealed comprised a seven layer barrier film having a sealant layer (facing the layer 38 of the lidstock) comprising 80%, by weight of the sealant layer, of PE2, and 20% PE3.

For the samples of Comparative Examples 9, 10, and 12, the tray liner of the tray to which each of the lidstocks was sealed comprised a seven layer barrier film having a sealant layer (facing the layer 38 of the lidstock) comprising 98% IO2, by weight of the sealant layer, and 2% silica in an ethylene/methacrylic acid copolymer masterbatch. Each of the ten samples for each of the formulations was initially opened, and subsequently reclosed, and reopened and reclosed, as in the test protocol previously described herein.

The results of the tests are shown in Tables 16 and 17. Table 16 shows the average initial peel force for each formulation; Table 17 shows the average peel force for each formulation when the lidstock has been reclosed and then reopened for the second, third, and subsequent times, for a total (including initial open and reclose) of ten iterations.

TABLE 16

Initial Peel Force***

| Examples | Sealant | Gauge | Initial peel force (lbf) (average of 10 samples) |
|---|---|---|---|
| Comp. Ex. 8 | 100% PE1 | 0.3 | 2.80 |
| | | | 1.16 |
| | | | 3.72 |
| Comp. Ex. 9 | 100% IO1 | 0.3 | 4.46 |
| | | | 0.88 |
| | | | 2.49 |
| Comp. Ex. 10 | 90% IO1 + 10% PE1 | 0.3 | 4.52 |
| | | | 0.76 |
| | | | 2.38 |
| Comp. Ex. 11 | 70% IO1 + 30% PE1 | 0.3 | 3.86 |
| | | | 0.91 |
| | | | 2.29 |
| Comp. Ex. 12 | 70% IO1 + 30% PE1 | 0.3 | 3.44 |
| | | | 0.71 |
| | | | 2.19 |

TABLE 17

Reopening Peel Force***

| reopen # | Comp. Ex. 8 | Comp. Ex. 9 | Comp. Ex. 10 | Comp. Ex. 11 | Comp. Ex. 12 |
|---|---|---|---|---|---|
| 2 | 0.72 | 1.73 | 1.59 | 0.47 | 0.49 |
| | 0.29 | 0.42 | 0.27 | 0.61 | 0.40 |
| | 1.22 | 1.27 | 0.85 | 1.32 | 0.93 |
| 3 | 0.66 | 1.57 | 1.18 | 0.34 | 0.00 |
| | 0.15 | 0.40 | 0.14 | 0.45 | 0.00 |
| | 0.50 | 1.03 | 0.47 | 0.97 | 0.00 |
| 4 | 0.53 | 1.33 | 1.02 | 0.29 | 0.00 |
| | 0.07 | 0.49 | 0.15 | 0.38 | 0.00 |
| | 0.19 | 1.39 | 0.54 | 0.89 | 0.00 |
| 5 | 0.50 | 1.32 | 0.95 | 0.26 | 0.00 |
| | 0.07 | 0.50 | 0.24 | 0.34 | 0.00 |
| | 0.26 | 1.43 | 0.82 | 0.71 | 0.00 |
| 6 | 0.48 | 1.11 | 0.91 | 0.25 | 0.00 |
| | 0.07 | 0.37 | 0.10 | 0.32 | 0.00 |
| | 0.23 | 1.32 | 0.31 | 0.72 | 0.00 |
| 7 | 0.47 | 1.09 | 0.81 | 0.27 | 0.00 |
| | 0.06 | 0.28 | 0.16 | 0.35 | 0.00 |
| | 0.18 | 0.66 | 0.51 | 0.73 | 0.00 |
| 8 | 0.44 | 0.94 | 0.81 | 0.26 | 0.00 |
| | 0.06 | 0.27 | 0.15 | 0.33 | 0.00 |
| | 0.17 | 0.75 | 0.48 | 0.72 | 0.00 |
| 9 | 0.42 | 0.86 | 0.76 | 0.23 | 0.00 |
| | 0.05 | 0.30 | 0.20 | 0.30 | 0.00 |
| | 0.15 | 1.02 | 0.65 | 0.67 | 0.00 |
| 10 | 0.43 | 0.80 | 0.69 | 0.22 | 0.00 |
| | 0.04 | 0.34 | 0.22 | 0.29 | 0.00 |
| | 0.11 | 1.08 | 0.73 | 0.62 | 0.00 |

The samples of Comparative Example 8 demonstrated a desirable low initial peel, but after the fifth reclosure, the subsequent reopens were measured at less than 0.5 lbf of peel force. This is considered unacceptable in the marketplace.

The samples of Comparative Example 9 demonstrated 9 reopens at greater than 0.5 lbf of peel force. However, there was some scatter in the peel force values for these reopens, so that a less than totally reliable reopen/reclosure mechanism was obtained. Additionally, the peel force of 4.5 lbf required to Initially open the package was too high; a package made with the formulation of Comparative Example 9 would be difficult to Initially open, and the force to open could cause tearing of the forming web (tray) and/or tray liner. This package is therefore also considered unacceptable in the marketplace.

The samples of Comparative Example 10 demonstrated 9 reopens at greater than 0.5 lbf of peel force, with less scatter in the peel force values for these reopens than with Comparative Example 9. However, like Comparative Example 9, the peel force of 4.5 lbf required to Initially open the package was unacceptably high.

The samples of Comparative Example 11 demonstrated a somewhat better initial peel force than Comparative Examples 9 and 10, but also demonstrated significant scatter in the data with respect to reopening force, with very inconsistent reopening performance characterized by a wide range of, and very low, reopening force values. This is considered unacceptable in the marketplace.

The samples of Comparative Example 12 demonstrated a desirable low initial peel, but after the second reclosure, the reopening peel force values fell to zero.

Two of the comparative examples, Comparative Examples 11 and 12, exhibited some individual peel force values of zero. This result is relatively apparent from the average values of Comparative Example 12 listed in Table 17, but Comparative Example 11 had in fact some individual samples with 0 peel force for each of the reopening cycles 2 through 10.

The present application is directed in various embodiments to the subject matter described in the following paragraphs. These are optional embodiments of any of the first or second aspects of the invention as described hereinabove in the Summary of the Invention, and for each aspect, these features can be included alone or in any suitable combination of these features:

the oxygen barrier of the laminated lidstock comprises polyvinylidene chloride copolymer.

the high modulus thermoplastic material of the laminated lidstock comprises biaxially oriented polyethylene terephthalate.

the second layer of the coextruded film, comprising a pressure sensitive adhesive, is adhered to the inner surface of the substrate film.

at least one of the outer and inner surfaces of the substrate film comprises a print layer.

the laminated lidstock further comprises a printed film, adhered to the outer surface of the substrate film, comprising a layer comprising biaxially oriented polyethylene terephthalate, and a print layer.

the first layer of the coextruded film comprises a blend of from 80% to 88%, by weight of the blend, of an ionomer resin, and from 12% to 20%, by weight of the blend, of an olefinic polymer selected from low density polyethylene, ethylene/vinyl acetate copolymer, ethylene/butyl acrylate copolymer, ethylene/acrylic acid copolymer, ethylene/methacrylic acid copolymer, ethylene/acrylate copolymer, and ethylene/methacrylate copolymer.

the first layer of the coextruded film comprises a blend of from 80% to 88%, by weight of the blend, of an ionomer resin, and from 12% to 20%, by weight of the blend, of low density polyethylene.

a portion of the laminated lidstock comprises a pull tab disposed at one end or corner of the package.

the package is absent a die-cut for opening the package.

the coextruded film comprises a third layer comprising a polymeric adhesive.

the third layer of the coextruded film, comprising a polymeric adhesive, is adhered to the inner surface of the substrate film.

the second layer comprising pressure sensitive adhesive is disposed between the first and third layers of the coextruded film.

the laminated lidstock is hermetically sealed to the tray liner as a perimeter seal.

All ranges disclosed herein are to be understood to encompass any and all subranges subsumed therein. The above descriptions are those of embodiments of the invention. All parts and percentages are by weight, unless otherwise indicated or well understood in the art. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by reference. Terms referring to polymers refer herein to both homopolymers and copolymers thereof, unless otherwise specified.

What is claimed is:

1. An easy-open, reclosable package comprising:
a) a tray comprising a tray liner, tray bottom, tray sides, and a tray flange, wherein the tray bottom and tray sides define a tray cavity, and wherein the tray liner comprises a sealant layer comprising at least 80%, by weight of the sealant layer, of ionomer resin;
b) a product disposed in the tray cavity; and
c) a laminated lidstock, sealed to the tray liner as a seal, comprising
   i) a substrate film, having an outer surface and an inner surface, comprising
      (a) a first layer comprising a high modulus thermoplastic material selected from the group consisting of biaxially oriented polyethylene terephthalate, biaxially oriented polypropylene, and biaxially oriented nylon, and
      (b) a second layer comprising a polymeric oxygen barrier having an oxygen permeability, of the barrier material, less than 50 cm$^3$ O$_2$/m$^2$·day·atmosphere measured at a thickness of 1 mil (ASTM D 3985); and
   ii) a coextruded film, having an outer surface and an inner surface, comprising
      (a) a first layer comprising a blend of from 80% to 88%, by weight of the blend, of an ionomer resin, and from 12% to 20%, by weight of the blend, of an olefinic polymer, and
      (b) a second layer comprising a pressure sensitive adhesive;
wherein
the first layer of the coextruded film is sealed to the tray liner;
the coextruded film is adhered to the inner surface of the substrate film; and
after the package has been opened, at least a portion of the pressure sensitive adhesive is exposed, and the package can be reclosed by adhering the pressure sensitive adhesive to a portion of the first layer of the coextruded film that remained sealed to the tray liner when the package was opened.

2. The package of claim 1 wherein the oxygen barrier comprises polyvinylidene chloride copolymer.

3. The package of claim 1 wherein the high modulus thermoplastic material comprises biaxially oriented polyethylene terephthalate.

4. The package of claim 1 wherein the second layer comprising a pressure sensitive adhesive is adhered to the inner surface of the substrate film.

5. The package of claim 1 wherein at least one of the outer and inner surfaces of the substrate film comprises printed indicia.

6. The package of claim 1 wherein the laminated lidstock further comprises a printed film, adhered to the outer surface of the substrate film, comprising a support layer comprising biaxially oriented polyethylene terephthalate, and a print layer.

7. The package of claim 1 wherein the coextruded film further comprises a third layer comprising a polymeric adhesive.

8. The package of claim 7 wherein the third layer comprising a polymeric adhesive is adhered to the inner surface of the substrate film.

9. The package of claim 1 wherein the first layer of the coextruded film comprises a blend of from 80% to 88%, by weight of the blend, of an ionomer resin, and from 12% to 20%, by weight of the blend, of an olefinic polymer selected from low density polyethylene, ethylene/vinyl acetate copolymer, ethylene/butyl acrylate copolymer, ethylene/acrylic acid copolymer, ethylene/methacrylic acid copolymer, ethylene/acrylate copolymer, and ethylene/methacrylate copolymer.

10. The package of claim 1 wherein the third layer of the coextruded film comprises a blend of from 80% to 88%, by weight of the blend, of an ionomer resin, and from 12% to 20%, by weight of the blend, of low density polyethylene.

11. The package of claim 1 wherein a portion of the laminated lidstock comprises a pull tab disposed at one end or corner of the package.

12. A laminated lidstock comprising:
a) a substrate film, having an outer surface and an inner surface, comprising
  i) a first layer comprising a high modulus thermoplastic material selected from the group consisting of biaxially oriented polyethylene terephthalate, biaxially oriented polypropylene, and biaxially oriented nylon, and
  ii) a second layer comprising a polymeric oxygen barrier having an oxygen permeability, of the barrier material, less than 50 $cm^3$ $O_2/m^2$·day·atmosphere measured at a thickness of 1 mil (ASTM D 3985); and
b) a coextruded film, having an outer surface and an inner surface, comprising
  i) a first layer comprising a blend of from 80% to 88%, by weight of the blend, of an ionomer resin, and from 12% to 20%, by weight of the blend, of an olefinic polymer,
  ii) a second layer comprising a pressure sensitive adhesive;
wherein the coextruded film is adhered to the inner surface of the substrate film.

13. The laminated lidstock of claim 12 wherein the oxygen barrier comprises polyvinylidene chloride copolymer.

14. The laminated lidstock of claim 12 wherein the high modulus thermoplastic material comprises biaxially oriented polyethylene terephthalate.

15. The laminated lidstock of claim 12 wherein the second layer comprising a polymeric adhesive is adhered to the inner surface of the substrate film.

16. The laminated lidstock of claim 12 wherein at least one of the outer and inner surfaces of the substrate film comprises printed indicia.

17. The laminated lidstock of claim 12 further comprising a printed film, adhered to the outer surface of the substrate film, comprising a support layer comprising biaxially oriented polyethylene terephthalate, and a print layer.

18. The laminated lidstock of claim 12 wherein the coextruded film further comprises a third layer comprising a polymeric adhesive.

19. The laminated lidstock of claim 18 wherein the third layer comprising a polymeric adhesive is adhered to the inner surface of the substrate film.

20. The laminated lidstock of claim 12 wherein the first layer of the coextruded film comprises a blend of from 80% to 88%, by weight of the blend, of an ionomer resin, and from 12% to 20%, by weight of the blend, of an olefinic polymer selected from low density polyethylene, ethylene/vinyl acetate copolymer, ethylene/butyl acrylate copolymer, ethylene/acrylic acid copolymer, ethylene/methacrylic acid copolymer, ethylene/acrylate copolymer, and ethylene/methacrylate copolymer.

* * * * *